(12) United States Patent
Hastoy et al.

(10) Patent No.: US 7,563,432 B2
(45) Date of Patent: Jul. 21, 2009

(54) SOLID CRYSTALLINE COK-7, A PREPARATION PROCESS, AND USE IN TRANSFORMING HYDROCARBONS

(75) Inventors: Gaëlle Hastoy, Fontenay-sous-Bois (FR); Johan Martens, Huldenberg (BE); Emmanuelle Guillon, Vernaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 701 days.

(21) Appl. No.: 11/367,714

(22) Filed: Mar. 6, 2006

(65) Prior Publication Data

US 2006/0210472 A1    Sep. 21, 2006

(30) Foreign Application Priority Data

Mar. 7, 2005 (FR) .................... 05 02239

(51) Int. Cl.
*C01B 39/46* (2006.01)
*C01B 39/48* (2006.01)
*B01J 29/70* (2006.01)
*C10G 35/095* (2006.01)
*C10G 47/04* (2006.01)
*C10G 73/00* (2006.01)

(52) U.S. Cl. .............. 423/718; 423/706; 423/708; 423/705; 208/28; 208/111.01; 208/135; 502/60

(58) Field of Classification Search ............ 423/718, 423/705, 706, 708; 502/60; 208/28, 111.01, 208/135
See application file for complete search history.

(56) References Cited

U.S. PATENT DOCUMENTS

| | | | |
|---|---|---|---|
| 4,300,911 A | 11/1981 | Marosi et al. | |
| 5,628,978 A * | 5/1997 | Tejada et al. | 423/705 |
| 5,910,299 A * | 6/1999 | Carluccio et al. | 423/706 |
| 5,952,257 A * | 9/1999 | Tejada et al. | 502/60 |
| 5,965,104 A * | 10/1999 | Lee et al. | 423/706 |
| 6,306,362 B1 * | 10/2001 | Han et al. | 423/702 |
| 6,613,302 B1 * | 9/2003 | Moscoso et al. | 423/718 |
| 2006/0110321 A1 * | 5/2006 | Corma et al. | 423/718 |
| 2008/0159953 A1 * | 7/2008 | Miller | 423/718 |

FOREIGN PATENT DOCUMENTS

| DE | 2909930 A1 | 9/1980 |
|---|---|---|
| EP | 0046504 A | 3/1982 |

* cited by examiner

*Primary Examiner*—David M Brunsman
(74) *Attorney, Agent, or Firm*—Millen, White, Zelano, Branigan, P.C.

(57) ABSTRACT

The invention concerns a solid crystalline designated COK-7, which has a particular X ray diffraction diagram. Said solid has a chemical composition, expressed on an anhydrous base in terms of moles of oxides by the formula $XO_2: mYO_2$, X representing one or more tetravalent element(s), Y representing at least one trivalent element. The invention also concerns a process for preparing said solid and the use of said solid in hydrocarbon transformation.

29 Claims, 1 Drawing Sheet

Degree 2 tetha

SOLID CRYSTALLINE COK-7, A PREPARATION PROCESS, AND USE IN TRANSFORMING HYDROCARBONS

TECHNICAL FIELD

The present invention relates to a novel solid crystalline hereinafter termed COK-7 having a novel crystalline structure, and to a process for preparing said solid.

The invention also concerns the use of this novel solid in transforming hydrocarbons.

PRIOR ART

The search for novel microporous molecular sieves has led over the past few years to the synthesis of a wide variety of this class of products. A wide variety of aluminosilicates with a zeolitic structure characterized in particular by their chemical composition, the diameters of the pores they contain, and the shape and geometry of their microporous system has been developed.

The term "zeolite" is generally associated with a solid composed of silicon and aluminium. However, the zeolitic structure may be conserved in a system which is purely silicic or in which the silicon is replaced by germanium, or in which the aluminium is replaced by boron, gallium or iron.

Among zeolites which have been synthesized over about forty years, a certain number of solids have resulted in significant advances being made in the fields of adsorption and catalysis. Examples of these which may be cited are Y zeolite (U.S. Pat. No. 3,130,007) and ZSM-5 zeolite (U.S. Pat. No. 3,702,886). The number of novel molecular sieves, including zeolites, which is synthesized each year, is constantly rising. A more complete description of the various molecular sieves which have been discovered may be found in the following work: "Atlas of Zeolites Structure Types", Ch. Baerlocher, W M Meier and D H Olson, Fifth revised Edition, 2001, Elsevier.

ZBM-30 zeolite and its preparation process has been described in European patent EP-A-0 046 504. ZSM-48 zeolite and it preparation process were described in EP-A-0 015 132. ZSM-48 is a zeolite with mean pore diameters which are slightly larger than ZSM-22. ZSM-48 zeolite does not have an official structure and belongs to a family of zeolites having structures similar to ZBM-30, EU-2 and EU-11. No structural type has been associated with these zeolites and the X ray diffraction spectra (XRD) of these solids are comparable with the literature and interpreted as a disorganized crisscrossing of different topologies (Studies in Surface Science 33 (1997)).

DESCRIPTION OF THE INVENTION

Characteristics of Solid

The present invention concerns a novel solid crystalline termed solid crystalline COK-7, having a novel crystalline structure. Said solid has a chemical composition, expressed as the anhydrous base in terms of moles of oxides defined by the following general formula: $XO_2$: $mY_2O_3$, in which X represents one or more tetravalent element(s), Y represents at least one trivalent element, m representing the number of moles of $Y_2O_3$ where m is in the range 0 to 300.

BRIEF DESCRIPTION OF THE DRAWING

The X ray diffraction diagram of the solid crystalline COK-7 of the invention, in its calcined form, is shown in FIG. 1 and comprises at least the peaks at the $d_{hkl}$ values given in Table 1. This novel solid crystalline COK-7 has a novel crystalline structure.

This diffraction diagram is obtained by radiocrystallographic analysis using a diffractometer employing the conventional powder technique with the $K\alpha 1$ peak of copper ($\lambda=1.5406$ Å). From the position of the diffraction peaks represented by the angle $2\theta$, using the Bragg relationship, the characteristic interplanar distances $d_{hkl}$ of the sample are calculated. The error estimation in the measurement $\Delta(d_{hkl})$ over $d_{hkl}$ is calculated by the Bragg relationship as a function of the absolute error $\Delta(2\theta)$ in the measurement of $2\theta$. An absolute error $\Delta(2\theta)$ of $\pm 0.2°$ is normally acceptable. The relative intensity $I_{rel}$ in each value of $d_{hkl}$ is measured from the height of the corresponding diffraction peak. The X ray diffraction diagram of the solid crystalline COK-7 of the invention comprises at least the peaks at values of $d_{hkl}$ given in Table 1. In the $d_{hkl}$ column, the mean values of the interplanar spacings are shown in Angstroms (Å). Each of these values must be supplemented with an error measurement $\Delta(d_{hkl})$ in the range $\pm 0.2$ Å to $\pm 0.008$ Å.

TABLE 1

Figure 1:
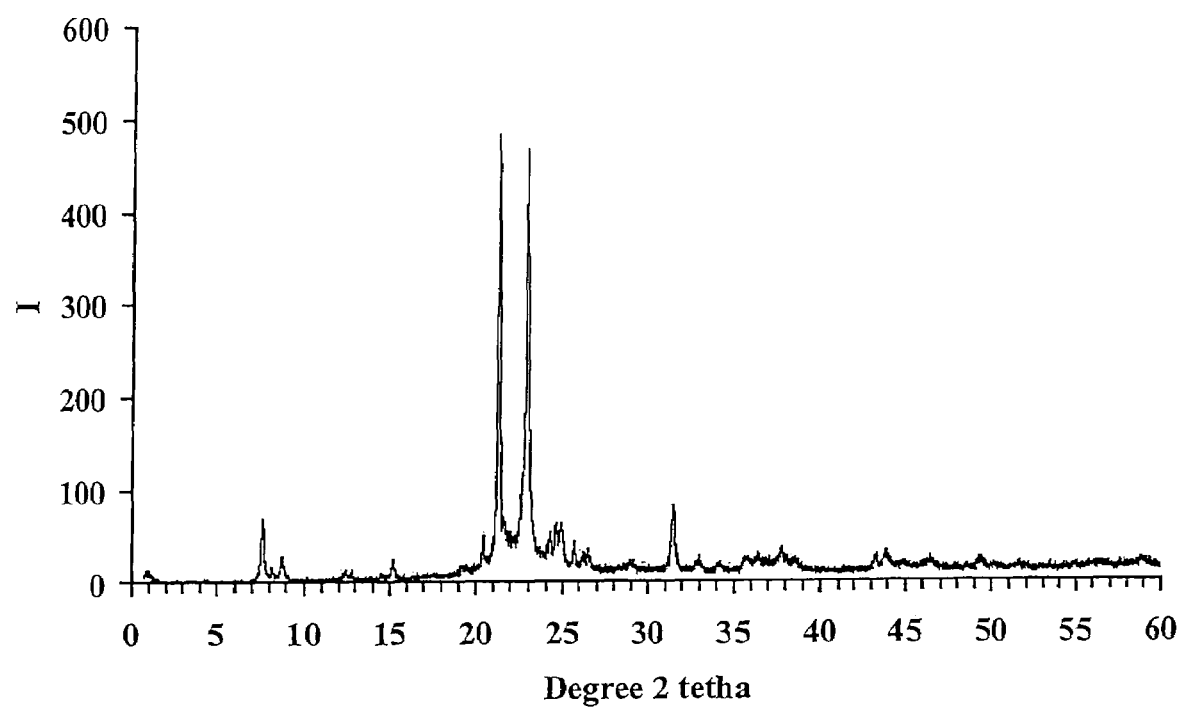

Mean values of $d_{hkl}$ and relative intensities measured on an X ray diffraction diagram of the solid crystalline COK-7 of the invention

| $d_{hkl}$ (Å) | 2 theta (°) | $I/I_0$ |
|---|---|---|
| 11.60 | 7.62 | m-vs |
| 10.80 | 8.17 | w-mw |
| 10.02 | 8.82 | w-mw |
| 5.80 | 15.26 | w |
| 4.34 | 20.41 | w |
| 4.17 | 21.25 | vs |
| 3.86 | 23.01 | m-s |
| 2.83 | 31.54 | vw-w | in which: vs = very strong;
m = medium;
w = weak;
s = strong;
mw = medium weak;
vw = very weak.

The relative intensity $I/I_0$ is given with respect to a relative intensity scale where a value of 100 is attributed to the most intense peak in the X ray diffraction diagram: vw<; $15 \leq w < 30$; $30 \leq mw < 50$; $50 \leq m < 65$; $65 \leq s < 85$; $vs \geq 85$.

In accordance with the invention, X is preferentially selected from silicon, tin and titanium, more preferably silicon, and Y is preferentially selected from aluminium, boron, iron, indium and gallium, highly preferably aluminium.

In a first implementation of the invention, X is silicon and Y is aluminium: the solid crystalline COK-7 of the invention is then a crystalline aluminosilicate having an X ray diffraction diagram identical to that described in Table 1.

The solid COK-7 then has particular characteristics, namely a modified constraint index CI° in the range 1.6 to 2.2, preferably in the range 1.7 to 2.1.

Measurement of these molecular sieve criteria uses the "decane test"; the procedure is described by J A Martens, M Tielen, P A Jacobs and J Weikamp, Zeolites 1984, 4, 98.

CI° corresponds to the ratio of the 2-methyl C9 to 5-methylC9 isomers at 5% n-decane isomerization.

In a second implementation of the invention, X is. silicon and the solid crystalline COK-7 of the invention is then a purely silicic solid having an X ray diffraction diagram identical to that described in Table 1.

In the case in which the solid crystalline COK-7 of the invention is present in the as synthesized form, i.e. directly derived from synthesis and prior to any step for calcining and/or ion exchange which are well known to the skilled person, said solid COK-7 comprises an organic nitrogen-containing template as will be described below, or its decomposition products, or its precursors.

According to the invention, R is a template from the amine family. Preferably, the amine templates used in accordance with the invention comprise alkylamines, alkyldiamines, alkyltriamines, alkyltetramines, pyrrolidine, piperazine, aminopiperazine, alkylpentamine, alkylhexamine and derivatives thereof.

Preferably, the organic template comprises 1 to 20 carbon atoms.

The template may be eliminated by conventional prior art techniques such as thermal and/or chemical treatments.

The solid crystalline COK-7 of the invention is preferably a zeolitic solid.

Preparation Process

The invention also concerns a process for preparing a solid-crystalline COK-7 in which an aqueous mixture comprising at least one source of at least one oxide $XO_2$, optionally at least one source of oxide $Y_2O_3$ and at least one organic nitrogen-containing template R are reacted, the mixture preferably having the following molar composition:

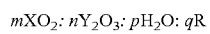
$mXO_2: nY_2O_3: pH_2O: qR$ m=100;
n between 0 and 10;
p between 0 and 160;
q between 0.05 and 20;

in which X is one or more tetravalent element(s), preferably silicon, Y is one or more trivalent element(s) selected from the group formed by the following elements: aluminium, iron, boron, indium and gallium, preferably aluminium.

Preferably, no alkali metal is introduced during the synthesis.

In accordance with the process of the invention, R is an organic nitrogen-containing template, generally from the amines family. Preferably, the amine templates used in accordance with the invention comprise alkylamines, alkyldiamines, alkyltriamines, alkyltetramines, pyrrolidine, piperazine, aminopiperazine, alkylpentamine, alkylhexamine and derivatives thereof. They are used alone or as a mixture.

The source of the element X may be any compound comprising the element X which can liberate that element in aqueous solution in the reactive form. Advantageously, when the element X is silicon, the silica source may be any one of those currently used in synthesizing zeolites, for example solid powdered silica, silicic acid, colloidal silicon or dissolved silica, or tetraethoxysilane (TEOS). Of the powdered silicas, it is possible to use precipitated silicas, in particular those obtained by precipitation from a solution of an alkali metal silicate, such as aerosil silicas, pyrogenic silicas, for example "CAB-O-SIL", and silica gels. It is possible to use colloidal silicas having different particle sizes, for example with a mean equivalent diameter in the range 10 to 15 nm or between 40 to 50 nm such as those sold under trade names such as "LUDOX". Preferably, the silicon source is LUDOX.

The source of element Y may be any compound comprising the element Y which may liberate that element in aqueous solution in the reactive form. In the preferred case in which Y is aluminium, the source of alumina is preferably sodium aluminate, or an aluminium salt, for example the chloride, nitrate, hydroxide or sulphate, an aluminium alkoxide or alumina per se, preferably in the hydrated or hydratable form, such as colloidal alumina, pseudoboehmite, gamma alumina or alpha or beta trihydrate. It is also possible to use mixtures of the sources cited above.

The process of the invention thus consists of preparing an aqueous reaction mixture known as a gel and comprising at least one source of at least one oxide $XO_2$, optionally at least one source of an oxide $Y_2O_3$ and at least one organic nitrogen-containing template R.

This gel is advantageously placed under hydrothermal conditions under autogenous pressure, optionally by adding gas, for example nitrogen, at a temperature in the range 100° C. to 200° C., preferably in the range 140° C. to 180° C., until solid COK-7 crystals of the invention are formed. The time necessary to obtain crystallization generally varies between 1 hour and several months depending on the composition of the reagents in the gel, stirring and the reaction temperature. The reaction is generally carried out with stirring or in the absence of stirring, preferably in the presence of stirring.

It may be advantageous to add seeds to the reaction mixture to reduce the time necessary for the formation of nuclei and/or the total crystallization period. It may also be advantageous to use seeds to encourage the formation of solid crystalline COK-7, to the detriment of impurities.

Such seeds comprise solid crystals, preferably crystals of solid COK-7.

The crystalline seeds are generally added in a proportion in the range 0.01% to 10% by weight of oxide $XO_2$ (preferably silica), used in the reaction mixture.

Preferably, after crystallization, the autoclave is cooled by quenching in cold water, at a temperature in the range 0 C. to 15° C., for a period in the range 10 minutes to 4 hours.

Next, the solid phase is filtered and washed; it is then ready for subsequent steps such as drying, dehydration and calcining and/or ion exchange. For these steps, all conventional methods which are known to the skilled person may be employed.

Preferably, the product obtained in the crystallization step undergoes at least one of the following steps:
  a step for separating solid from the crystallization mixture;
  a step for washing the solid; and
  a step for drying said solid.

The solid crystalline is generally separated from the mixture by any method which is known to the skilled person such as filtration. The solid is then washed with water, preferably deionized water or THF (tetrahydrofuran).

The drying step is generally carried out at a temperature in the range 50° C. to 150° C. for a period of 12 to 30 hours.

Drying is preferably carried out at atmospheric pressure, but it may be carried out under pressure.

A calcining step at the end of the synthesis can reveal the porosity of the zeolitic solid by decomposition of the organic template. This calcining step may advantageously be carried out in air or pure oxygen (or an oxidizing medium), at a temperature in the range 300° C. to 800° C.

The synthesis process described above is carried out using two preferred modes in accordance with the invention:
  1—For the synthesis of a purely silicic solid, in a preferred implementation of the process of the invention, an aqueous mixture comprising a source of silicon and at least one diamine, preferably hexamethylenediamine, is reacted.
  2—For the synthesis of an alumino-silicic solid, in a preferred implementation of the process of the invention, an aqueous mixture comprising a source of silicon, a source of aluminium and at least one amine, preferably triethylenetetramine, is reacted in the presence of water. After homogenizing the primary gel, seeds of COK-7 are added. The crystalline seeds are generally added in a proportion in the range 0.01% to 10% by weight of the oxide $XO_2$, preferably silica, used in the reaction mixture.

In a variation of this preferred implementation of the process of the invention, an aqueous mixture comprising a source of silicon, a source of aluminium and a mixture of at least two amines may be reacted, preferably a mixture of triethylenetetramine and hexylamine. The proportion of one amine with respect to the other varies from 10% to 90% by weight.

In the case of an aluminosilicic solid, the final solid preferably has a silicon-to-aluminium atomic ratio in the range 10 to 300, highly preferably in the range 30 to 100.

The solid of the invention or the solid prepared using the process of the invention may be used as a catalyst or catalyst support for transforming hydrocarbons in refining and petrochemistry, more particularly for hydrosomerization or catalytic dewaxing reactions.

The invention will now be illustrated in the following examples.

EXAMPLE 1

Synthesis of Purely Silicic COK-7

18 g of Ludox AS40 (DuPont) was dissolved in 31 ml of water. 1.94 g of KOH (Riedel-Haën) diluted in 6.75 ml of water was added to 4.17 g of diaminohexane (Acros Organics) and 37.5 ml of water. The two prepared solutions were mixed with stirring.

The resulting gel had the following composition:

$H_2O/SiO_2=40$; $KOH/SiO_2=0.29$; diaminohexane/$SiO_2=0.30$

It was placed in an stirred autoclave at 150° C. for 2.5 days. After crystallization, the solid was filtered, washed, dried at 60° C. then calcined in nitrogen at 400° C. for 5 hours, then in oxygen at 550° C. for 15 h.

EXAMPLE 2

Synthesis of Silicoaluminic COK-7

46.15 g of triethylenetetramine (Acros, 60% pure) was added to 46.15 g of water. Next, 7.69 g of Aerosil (UCB 380 g/m$^2$) was added with stirring, followed by adding 0.17 g of $Al(OH)_3$ (Merck).

The composition of the gel was as follows:

$H_2O/SiO_2=20$; triethylenetetramine/$SiO_2=2.46$; $Al_2O_3/SiO_2=0.0084$

When the gel was homogeneous, 0.66 g of calcined seeds of silicic COK-7 was added.

The final gel resulting was placed in an autoclave at 170° C. for 88 hours with stirring. After 88 hours, the autoclave was immersed in cold water (10° C.) for 1 h 30. The solid was filtered, washed, dried at 60° C. and calcined in oxygen at 550° C. for 15 h.

EXAMPLE 3

Synthesis of Silicoaluminic COK-7

A solution of 46.155 g triethylenetetramine (Acros, 96%) diluted in 46.155 g of $H_2O$ was prepared. 7.69 g of Aerosil (UCB 380 g/m$^2$) was added thereto with continuous stirring, then 23.08 g of hexylamine (Aldrich, 98%) and 0.165 g of $Al(OH)_3$ (Merck) were added.

The gel was placed in an autoclave at 170° C. for 7 days with stirring. The autoclave was then immersed in cold water (10° C.) for 1 h 30.

The solid was filtered, washed with water and THF, dried at 60° C. and calcined in nitrogen at 400° C. for 5 h, then in oxygen at 550° C. for 15 h.

EXAMPLE 4

Comparison of Characteristics Obtained Using the Decane Test

The solid COK-7 was obtained using the procedure described in Example 2. The COK-7 solid obtained underwent ion exchange in a solution of 0.5N $NH_4Cl$, at about 100° C. for 5 hours under reflux.

ZSM-48 was obtained using the operating procedure described in volume 33, pages 282-284 of the series *Studies in Surface Science and Catalysis*. The zeolite then underwent calcining in a stream of dry air for 12 hours at 550° C. to eliminate the organic template used for its synthesis. The as synthesized ZSM-48 zeolite underwent calcining at 550° C. in a stream of dry air for 12 hours. The solid ZSM-48 obtained underwent 4 successive ion exchange steps in a solution of 10N $NH_4NO_3$ at about 100° C. for 4 hours for each exchange.

ZBM-30 zeolite was synthesized in accordance with BASF patent EP-A-0 046 504 with the organic template triethylenetetramine. The as synthesized ZBM-30 zeolite underwent calcining at 550° C. in a stream of dry air for 12 hours.

| Decane test | COK-7 | ZSM-48 | ZBM-30 |
|---|---|---|---|
| CI° | 1.7 | 2.4 (Martens et al, Zeolites, 1984, vol 4, 98-107) 5.2 (Jacobs et al, Pure Appl. Chem, 1986, vol 589, No 10, 1329-1338) | 2.3 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 05/02.239, filed Mar. 7, 2005 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A solid crystalline COK-7 with a chemical composition expressed as the anhydrous base in terms of moles of oxides defined by the following general formula: $XO_2$: $mY_2O_3$, in which X represents one or more tetravalent element(s) selected from silicon, tin and titanium, Y represents at least one trivalent element selected from aluminium, boron, iron, indium and gallium, m representing the number of moles of $Y_2O_3$ where m is in the range 0 to 300, said solid having an X ray diffraction diagram in the calcined form comprising at least the following peaks for the values of $d_{hkl}$:

| $d_{hkl}$ (Å) | 2 theta (°) | $I/I_0$ |
|---|---|---|
| 11.60 | 7.62 | m-vs |
| 10.80 | 8.17 | w-mw |
| 10.02 | 8.82 | w-mw |
| 5.80 | 15.26 | w |
| 4.34 | 20.41 | w |
| 4.17 | 21.25 | vs |
| 3.86 | 23.01 | m-s |
| 2.83 | 31.54 | vw-w | in which: vs = very strong;
m = medium;
w = weak;
s = strong;
mw = medium weak;
vw = very weak.

2. A solid crystalline aluminosilicate COK-7 according to claim 1, in which X is silicon and Y is aluminium.

3. A solid crystalline aluminosilicate COK-7 according to claim 2, which has a modified constraint index CI° between 1.6 and 2.2, in which CI° corresponds to the ratio of 2-methylC9 to 5-methylC9 isomers at 5% n-decane isomerization.

4. A solid crystalline silicic COK-7 according to claim 1, in which X is silicon.

5. A solid crystalline COK-7 according to claim 1, which, in its as synthesized form, comprises an organic nitrogen-containing template R, its decomposition products or its precursors.

6. A solid crystalline COK-7 according to claim 5, in which the organic template R comprises 1 to 20 carbon atoms.

7. A solid crystalline COK-7 according to claim 5, in which R is a template from the amine family.

8. A solid crystalline COK-7 according to claim 7, in which R is selected from alkylamines, alkyldiamines, alkyltriamines, alkyltetramines, pyrrolidine, piperazine, aminopiperazine, alkylpentamine, alkylhexamine and derivatives thereof.

9. A solid crystalline COK-7 according to claim 1, which is a zeolitic solid.

10. A process for preparing a solid crystalline COK-7 according to claim 1, in which an aqueous mixture comprising at least one source of at least one oxide $XO_2$, optionally at least one source of an oxide $Y_2O_3$ and at least one organic nitrogen-containing template R are reacted, the mixture preferably having the following molar composition:

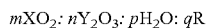
$mXO_2: nY_2O_3: pH_2O: qR$ m=100;
n between 0 and 10;
p between 0 and 160;
q between 0.05 and 20;
in which X is one or more tetravalent element(s) selected from silicon, tin and titanium, Y is one or more trivalent element(s) selected from the group formed by the following elements: aluminium, iron, boron, indium and gallium.

11. A preparation process according to claim 10, in which X is silicon and Y is aluminium.

12. A process according to claim 10, in which the organic nitrogen-containing template R is selected from the amine family.

13. A process according to claim 12, in which the organic nitrogen-containing template R is selected from alkylamines, alkyldiamines, alkyltriamines, alkyltetramines, pyrrolidine, piperazine, aminopiperazine, alkylpentamine, alkylhexamine and derivatives thereof.

14. A preparation process according to claim 10 in which a gel is placed under hydrothermal conditions at an autogenous reaction pressure, optionally by adding gas, at a temperature in the range 100° C. to 200° C. until crystals of solid COK-7 are formed, with stirring or in the absence of stirring.

15. A process according to claim 10, in which seeds comprising solid crystals are added to the mixture.

16. A process according to claim 15, in which the solid crystals are crystals of solid COK-7.

17. A process according to claim 15, in which the crystalline seeds are added in a proportion in the range 0.01% to 10% by weight of the oxide $XO_2$ used in the reaction mixture.

18. A process according to claim 10 in which crystallization is followed with cooling by quenching in cold water, to a temperature in the range 0° C. to 15° C., for a duration in the range 10 minutes to 4 hours.

19. A process according to claim 10, in which product obtained in crystallization undergoes at least one of the following:
separating solid from the crystallization mixture;
washing the solid; or
drying said solid.

20. A process according to claim 19, in which the solid undergoes calcining at the end of synthesis.

21. A process according to claim 20, in which calcining step is carried out in air or pure oxygen (or oxidizing medium), at a temperature in the range 300° C. to 800° C.

22. A process according to claim 10, in which an aqueous mixture comprising a source of silicon and at least one diamine is reacted.

23. A process according to claim 22, in which the diamine is hexamethylenediamine.

24. A process according to claim 10, in which an aqueous mixture comprising a source of silicon, a source of aluminium and at least one amine is reacted in the presence of water.

25. A process according to claim 24, in which the amine is triethylenetetramine.

26. A process according to claim 24, wherein the amine comprises a mixture of triethylenetetramine and hexylamine.

27. A method for the transformation of hydrocarbons in refining and petrochemistry, comprising subjecting hydrocarbons to transformation conditions in the presence of a solid crystalline COK-7 according to claim 1.

28. A method according to claim 27, comprising the hydrosomerization of hydrocarbons.

29. A method according to claim 27, comprising the catalytic dewaxing of hydrocarbons.

* * * * *